US008770556B2

(12) United States Patent
Reis et al.

(10) Patent No.: US 8,770,556 B2
(45) Date of Patent: Jul. 8, 2014

(54) LIQUID OR PULP AERATION DEVICE

(76) Inventors: José Antonio Alves e Silva Reis, Espírito Santo (BR); Leonidio Stegmiller, Espírito Santo (BR); Aldo Gamberini Júnior, Espírito Santo (BR); Romeu Venturott Ferreira, Espírito Santo (BR); Romero Santana Azeredo de Jesus, Espírito Santo (BR); Gelson Luis Rocha, Espírito Santo (BR); Cláudio Marcio Oliveira Cesário, Espírito Santo (BR); Ely Valeriano dos Santos, Espírito Santo (BR); José Maia, Espírito Santo (BR); Antônio Fernando Pereira dos Santos, Espírito Santo (BR); Edvaldo Marcelino Faustino, Espírito Santo (BR); Altair Barbosa Silva, Espírito Santo (BR); Emerson William de Carvalho, Espírito Santo (BR)

( * ) Notice: Subject to any disclaimer, the term of this patent is extended or adjusted under 35 U.S.C. 154(b) by 621 days.

(21) Appl. No.: 12/377,893

(22) PCT Filed: Aug. 22, 2007

(86) PCT No.: PCT/BR2007/000213
§ 371 (c)(1),
(2), (4) Date: Feb. 18, 2009

(87) PCT Pub. No.: WO2008/022420
PCT Pub. Date: Feb. 8, 2008

(65) Prior Publication Data
US 2011/0018148 A1    Jan. 27, 2011

(30) Foreign Application Priority Data
Aug. 22, 2006    (BR) ..................................... 0603592

(51) Int. Cl.
*B01F 3/04*          (2006.01)

(52) U.S. Cl.
USPC .......................................... 261/95; 261/112.1

(58) Field of Classification Search
USPC .......... 261/34.1, 95, 98, 111, 112.1, DIG. 26, 261/DIG. 39
See application file for complete search history.

(56) References Cited

U.S. PATENT DOCUMENTS 522,549 A * 7/1894 Barnard ........................ 261/36.1
1,957,138 A * 5/1934 Hasselbach ....................... 159/8

(Continued)

FOREIGN PATENT DOCUMENTS

EP          0887390 A1    12/1998
GB         1522248 A      8/1978

(Continued)

OTHER PUBLICATIONS

International Search Report in parent International case (PCT/BR07/00213), dated Dec. 12, 2007, M. Aigner, Austrian Patent Office.
Written Opinion in connection with ISR in parent International case (PCT/BR07/00213), dated Dec. 12, 2007, M. Aigner, Austrian Patent Office.

*Primary Examiner* — Charles Bushey
(74) *Attorney, Agent, or Firm* — Hughes Hubbard & Reed LLP

(57) ABSTRACT

"LIQUID OR PULP AERATION DEVICE" that projects liquid or pulp (P) through a spreading nozzle on a chain curtain (C) and captures air bubbles from the liquid or pulp (P) while the fluid outflows through the curtain links (C) by gravity forming films by virtue of an interaction of the surface strain and wettability between the three surfaces in question. As far as the outflow is concerned, these films end up interacting between themselves capturing the remaining air between them, thus forming profuse bubbles, resulting in the formation of liquid or foaming pulp (P) by virtue of the chain discharge (C).

4 Claims, 2 Drawing Sheets

(56) References Cited

U.S. PATENT DOCUMENTS

| | | | |
|---|---|---|---|
| 1,966,571 A | * | 7/1934 | Webb .............................. 451/84 |
| 2,949,934 A | * | 8/1960 | Schrenk .......................... 138/38 |
| 3,151,187 A | * | 9/1964 | Comte ............................. 261/3 |
| 3,743,256 A | * | 7/1973 | Oplatka .......................... 261/98 |
| 4,014,962 A | * | 3/1977 | del Notario ................. 261/112.1 |
| 4,224,257 A | * | 9/1980 | Robinson .................... 261/23.1 |
| 4,485,013 A | * | 11/1984 | Cockman ................... 210/242.2 |
| 4,769,186 A | * | 9/1988 | Raybon ........................ 261/109 |

FOREIGN PATENT DOCUMENTS

| | | |
|---|---|---|
| GB | 2347414 A | 9/2000 |
| JP | 60-063328 | 4/1985 |
| JP | 60-063328 A | 4/1985 |

* cited by examiner

LIQUID OR PULP AERATION DEVICE

CROSS-REFERENCE TO RELATED APPLICATIONS

This application is the National Stage Entry for International Patent Application No. PCT/BR07/000213, filed Aug. 22, 2007, which International Patent Application claimed priority based on Brazilian Patent Application No. PI0603592-2, filed Aug. 22, 2006, and this application claims the benefit of the respective filing dates of, and claims priority based upon, each of said applications, each of which are hereby incorporated by reference herein in their entirety.

The present report outlines a device comprising, basically, an aspersion nozzle and chain curtains with suspended links the purpose of which is to aerate liquids or pulps by generating and capturing air bubbles arising out of physical properties combination such as surface strain and wettability, gravity force and plastic conformation. This device particularly allows for a more consistent and economical way of aerating water, liquids and mineral and/or organic pulps in diverse industrial and economical segments.

As it is well known by accomplished technicians in this science, in the segment of mining and, more specifically, in the segment of iron ore fine pelletization, the process called coating where a refractory mineral cover is applied on burned pellets for the direct reduction market is widely known.

Steel plants that use the direct reduction process for the conversion of iron ore or fine iron ore pellets into metallic iron have to make adaptations in order to face a process bottle neck called sticking.

In contrast with blast furnaces, in direct reduction furnaces the load is converted into high temperature iron and in a reducing environment. Under such environment, however, the load is not fused. Reducing gases penetrate load components pores (either pellets of granulate) and, under controlled temperature, it forms the thermochemical reduction of iron ore oxide into metallic iron, resulting in a solid and sponge-like product known as sponge iron, the components of which preserve the original form of pellets or granulate from which they were formed.

Aimed at the optimization of the productivity of the aforementioned process, operational temperatures have been elevated and as a result of this operational condition, the sticking phenomenon gets even worse.

It is understood that this sticking process involves the formation of big solid sponge iron blocks formed by the semi-fusion and surface melting of pellets or iron granulate exposed to rising temperatures. As a result of such agglomeration, there happens a performance deficit in the furnace, making it difficult to be discharged, thus overloading downstream equipment.

To solve this problem a process named coating was devised to allow for a thin layer of refractory material to be applied to the surface of pellets along further stages following its burning (production) and before its thermochemical reduction in the case of direct reduction furnaces. This process also involves the aspersion of this aqueous pulp finely milled refractory material over moving pellets, for the dyeing of the same. To that end aspersion, nozzles are strategically positioned in locations such as transfer chutes between conveyor belts and over the belts as well.

This process has the inconvenience of causing continuous obstruction of nozzles in that because of their having narrow openings for the aspersion effect they become sensible to the presence of any strange material found in the refractory pulp as well as to the packing of the refractory material, which settles down close to them during prolonged shutdowns of coating operations.

These frequent obstructions lay open the fragility of this system the correction of which are time consuming, exposing maintenance teams to physical and mental exhaustion, thus becoming vulnerable to accidents. For a variety of reasons the correction of this problem at the origin is not frequently possible which leads to an unacceptable time interval recurrence.

Due to the high speed under which pulp flows inside bottle-necked portions of nozzles the resulting wear of nozzles, become another inconvenience. Concomitantly with the abrasiveness of pulp contained minerals, the high speed widens out these nozzles design, changing both the target of pulp jets and the outflow, thus increasing mineral specific consumption and making it even worse to evenly distribute the pulp on pellets.

Another inconvenient is the relatively high levels of pressure deemed necessary for the jet aspersion process. These pressure levels make it difficult to prevent pulp spills from the distribution circuit at curves, joints and valves and in the mechanical sealing of centrifuge pumps used in the process.

The immediate consequence of such inconveniences either individually or jointly is the operational instability in the coating process, leading to large coating defects on pellet volumes as well as high degree of sticking making for unsatisfied clients.

Lab-based sample sticking ratio reflects the direct reduction furnace agglomeration as seen above. It is expressed based on agglomerated mass percentage in relation to initial free mass subjected to high temperature, pressure and thermochemical reduction.

This patent application differs from the ones alluded to in that it purposes to provide a device that makes if possible for the aeration of mineral pulps, made of water and finely milled minerals, pure or combined with materials such as lime, limestone, dunite, bauxite, cement and whatever mineral is assessed and/or used in pelletization plants for iron ore pellet coating, either hot or cold.

For such purposes this device has been designed based on pure physics principles such as surface strain, wettability, gravity force, etc., as well as commonly used input such as chains, tubes, plates, bolts and nuts, either metallic or not.

Thus, still another object of this present invention is to provide a device that shall be able to make for the aeration of mineral pulps, as specified above, to be used in iron ore pellet coating pelletization plants. This device shall also make for the application of such pulps on moving pellet loads on conveyor belts for an evenly crossed spreading and percolation along the same in order to reach bottom belt pellets.

For such purposes such device has been designed as a kit comprising five modules listed below and can be easily adapted to any situation provided that there is a conveyor belt with a four-meter high free portion along its path, preferably close to feeding.

In order to achieve an evenly crossed spreading on pellets and bottom percolation the application module is provided with chains to form a curtain spanning all the pellet load belt extension.

Thus, still another object of this present invention is to provide for the aeration of mineral pulp to be used in iron ore pellet coating systems for pelletization plants in order to prevent materials alien to the process from blocking the end of nozzles or any other portion to ensure operational stability and application homogeneity all along the way the system is being used.

In order to achieve this end the device is provided with a spreading nozzle the opening of which is rectangular being sufficiently dimensioned so as not to hold inside it any material alien to the process.

Thus, still another object of this present invention is to provide for the aeration of mineral pulp to be used in iron ore pellet coating systems for pelletization plants in order to prevent spillage and wayward sprinkling, thus inhibiting waste, dirt and environmental problems.

To achieve this purpose the device has been designed to meet three requirements:

a) As for the process it is positioned in such a way that curtain ends are placed really close to pellet loads;

b) The aeration process buffers pulp fall speed and thus avoids sudden compression of given portions of the same as they contact pellets, inhibiting projections.

c) Air bubbles act like buffers that soften the impact between pulp and pellets.

Thus, still another object of this present invention is to provide for the aeration of mineral pulp to be used in iron ore pellet coating systems for pelletization plants in order to provide for a long term operational use and no need for maintenance and part replacement by virtue of early wear.

To achieve this purpose this device has been deliberately provided with robust parts such as the Schedule 80 3" diameter steel tube spreading end, welded short chain links, 5 mm thick steel containing chute, but materials and dimensions other these can also be used to ensure the devices heavy duty features.

Thus, still another object of this present invention is to provide for the aeration of mineral pulp to be used in iron ore pellet coating systems for pelletization plants in order to allow for the operation of the pulp pumping system all the way from the preparation point down to the application under low pressure to alleviate the pumping energetic load as well as to prevent leakage from transportation tubes and in the pump sealing systems such as gaskets and mechanical seals.

To achieve this purpose this device's nozzle has been appropriately provided with a 3" diameter application tube and a non-bottlenecking nozzle, which, in addition to a correctly dimensioned pulp distribution line, from homogenization tanks to percolator ensures low load loss levels along the circuit, thus maintaining low pumping pressure.

These and other objects of this present invention can be achieved when the liquid or pulp is projected through the spreading nozzle on the chain current and the combination of physical properties such as surface strain and wettability and plastic conformation captures air bubbles in the liquid or in the pulp when the it flows through the chain links formed by films by virtue of the interaction of surface strain and wettability between the three surfaces in question (solid/current, liquid/pulp and gas/air). This film is formed inside each link, between them and between chains. As far as the outflow is concerned, these films end up interacting between themselves capturing the remaining air between them, thus forming profuse bubbles, resulting in the formation of liquid or foaming pulp by virtue of the chain discharge.

Further, this present inventions shall be described with reference to the attached drawings in which.

Figure 1:
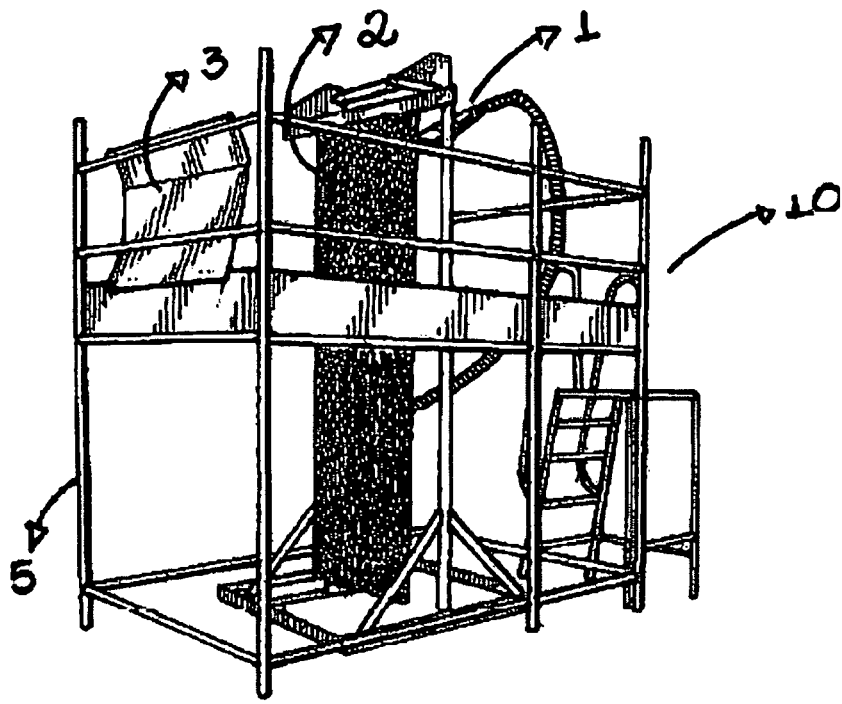
FIG. 1 is a perspective view of the aeration device for liquid or pulp.
Figure 2:
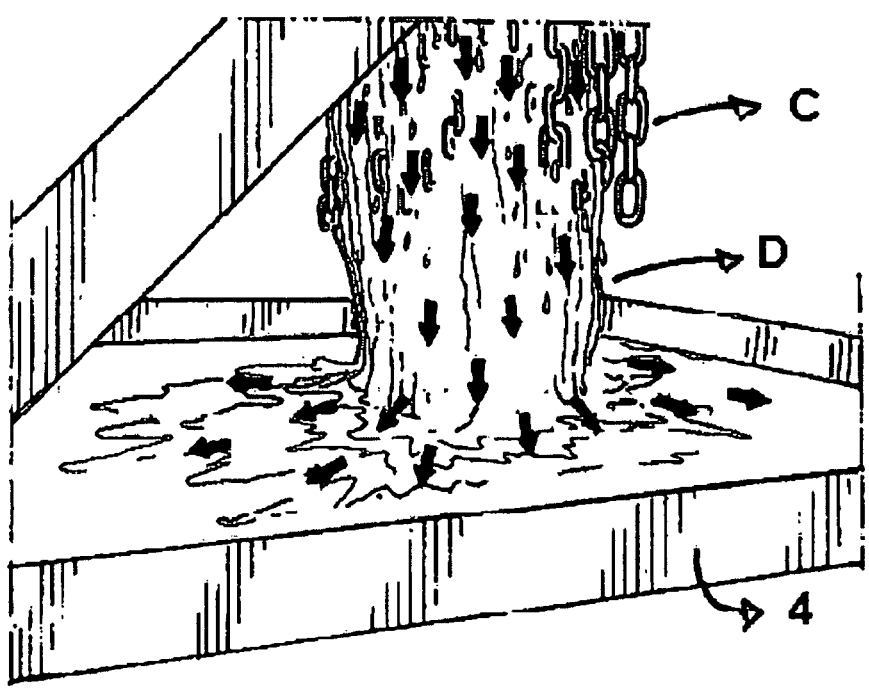
FIG. 2 is a detailed view of the generation of foaming liquid made possible by the use of the liquid or pulp aeration device.
Figure 3:
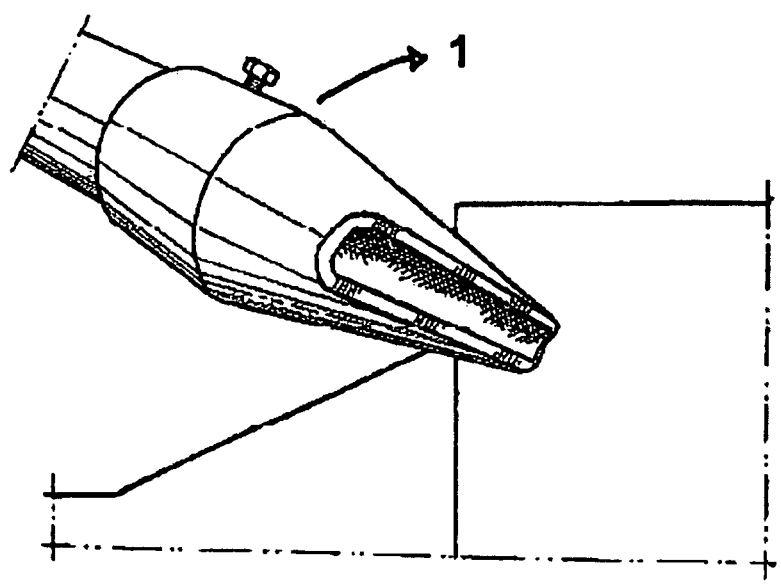
FIG. 3 is a detailed view of the anti-obstruction spreading nozzle used in the liquid or pulp aeration device.
Figure 4:
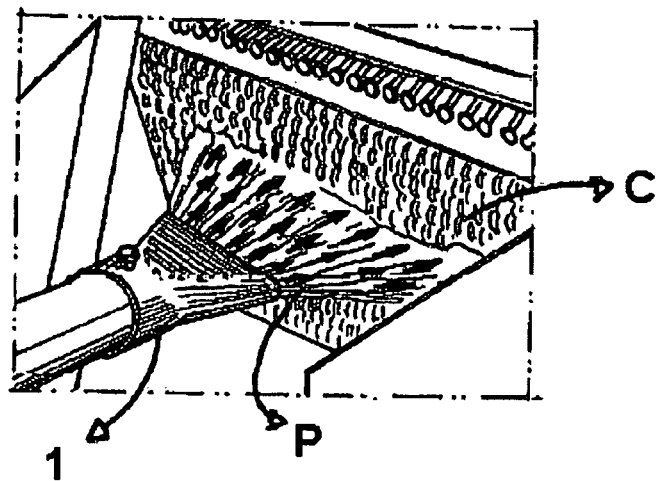
FIG. 4 is a detailed view of the distributions and homogeneity of the liquid made possible through the use of the liquid or pulp aeration device.
Figure 5:
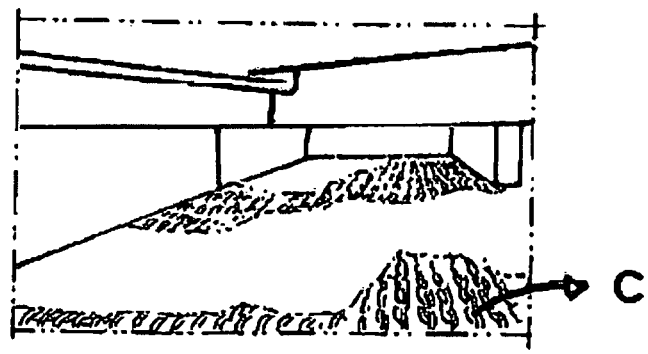
FIG. 5 is a detailed view of the distribution and homogeneity of the liquid mad possible through the use of the pulp or liquid aeration device.

Such a device conceived to conform to the aforementioned objects and mounted with adequate dimensions to be used in pelletization plants, comprises five modules:

1. Application module, or applicator (1), comprising three parts: the first one is made up of one 3" diameter and 0.8 m long tube; the second, coupled to the first, is the application nozzle, also made of tube having a flattened end with a 20×210 mm rectangular opening, which can be freely turned along its axle for optimum positioning; the third is the applicator support, which, because of its specifically built characteristics allows for best positioning to meet current needs such as distance to currents (C), angle, alignment and elevation.

2. Aeration and spreading module (2), which is the main item of the prototype, comprising 3 m long contiguous chain sets (C), lined up and forming curtains, which, upon being suspended, form a cohesive and sufficiently sponged set to allow for the aeration phenomenon and deliberately free to facilitate self-cleaning and occasional cleanups.

3. Aiming module (3) comprising a front plate and a posterior one lightly leaning against chains (C), forming a sandwich to redirect escaping flows from the pulp (P) and to support an even distribution of the same along curtain span.

4. Receptor module (4) comprising a box positioned below the application module being supported by the chain. This module also helps with pulp distribution (P) and contains occasional sprinkles from the applicator (1).

5. Structural module (5) comprising metallic profiles, which support and reinforce the system, keeping each component of the system firmly established and concomitantly allowing for fast and safe mechanical inspections and interventions.

The mineral pulp (P) that arrives at the equipment under low pressure goes through the applicator (1), which projects it freely upon the curtains for a uniform distribution on the same. While the fluid outflows through the curtain by gravity its volume (P) gets even more distributed in such a way so as to exit through the lower end, thus covering all the crossed extension of the burned pellet layer on the belt conveyor.

As the pulp (P) interacts with the chains (C) and consequently is subjected to the aeration and due to the thermal insulation obtained through air bubbles, the pulp (P) percolates rapidly through and is taken to the lower end of the pellet load on the belt concomitantly to the beginning of the evaporation process by virtue of pellet over boiling water temperature. This phenomenon is named aerated percolation. Therefore, this process makes for good dyeing and sticking of the mineral pigment to the pellet load running under the device, thus ensuring high level of covering.

In spite of being described and illustrated particularly as a set comprising a liquid (10) and pulp aeration device it is worth mentioning that constructive and applicability alterations are feasible and executable without drifting away from the scope of this present invention.

What is claimed is:

1. A liquid or pulp aeration device comprising:
at least a contiguous set of chains with links lined up and configured as a curtain;
at least a spreading nozzle to project the liquid or pulp over the set of chains;
wherein the flow of liquid or pulp through the links of the chains form films inside each link, between links and between chains, these films interacting between themselves, capturing air between them and forming bubbles, the bubbles resulting in the formation of liquid or foaming pulp;

an application module comprising a first part made up of a tube; a second part, coupled to the first and comprising the spreading nozzle, the spreading nozzle being freely turned along its axle; and a third part comprising an adjustable support for adjusting the position of the application module;

an aeration and spreading module comprising the contiguous set of chains lined up and configured as curtains;

an aiming module comprising a front plate and a posterior plate, the plates lightly leaning against the chains of the aeration and spreading module;

a receptor module comprising a box positioned below the application module; and a structural module supporting the other modules.

2. A liquid or pulp aeration device according to claim 1, wherein the free end of the spreading nozzle has a flattened configuration with a rectangular opening.

3. A liquid or pulp aeration device according to claim 1, wherein the structural module comprises metallic profiles which support the other modules.

4. A method for the aeration of liquid or pulp in the liquid or pulp aeration device defined in any one of claims 1 to 3, comprising:

projecting the liquid or pulp through the spreading nozzle over the contiguous set of chains with links lined up and configured as a curtain;

the liquid or pulp flowing, by gravity, through the links of the chains;

the liquid or pulp interacting with the chains, the interaction between the liquid or pulp and the chains causing films inside each link, between links and between chains; said films interacting between themselves and capturing air between them; and capturing the air between the films forming bubbles that aerate the liquid or pulp.

* * * * *